(12) United States Patent
Busby et al.

(10) Patent No.: US 11,519,452 B2
(45) Date of Patent: Dec. 6, 2022

(54) ADVANCED NUT AND BOLT

(71) Applicant: Arconic Inc., Pittsburgh, PA (US)

(72) Inventors: Donald C. Busby, Woodway, TX (US); Richard Franklin, Hewitt, TX (US); James L. Wollard, Waco, TX (US)

(73) Assignee: HOWMET AEROSPACE INC., Pittsburgh, PA (US)

( * ) Notice: Subject to any disclaimer, the term of this patent is extended or adjusted under 35 U.S.C. 154(b) by 127 days.

(21) Appl. No.: 16/407,439

(22) Filed: May 9, 2019

(65) Prior Publication Data
US 2019/0264728 A1    Aug. 29, 2019

Related U.S. Application Data

(62) Division of application No. 14/553,476, filed on Nov. 25, 2014, now abandoned.

(60) Provisional application No. 61/908,922, filed on Nov. 26, 2013.

(51) Int. Cl.
*F16B 39/30* (2006.01)
*F16B 39/34* (2006.01)

(52) U.S. Cl.
CPC .............. *F16B 39/30* (2013.01); *F16B 39/34* (2013.01)

(58) Field of Classification Search
CPC ........... F16B 39/30; F16B 39/34; F16B 37/00
USPC ............................. 411/307, 366.3, 303, 432
See application file for complete search history.

(56) References Cited

U.S. PATENT DOCUMENTS

| | | | |
|---|---|---|---|
| 1,197,467 A | | 11/1877 | Harvey |
| 1,697,118 A | | 1/1929 | Hoke |
| 1,884,973 A | | 10/1932 | Hoke |
| 1,922,689 A | * | 8/1933 | Linnenbruegge ....... F16B 33/02 470/9 |
| 1,953,095 A | | 4/1934 | Baker |
| 2,382,748 A | | 8/1945 | Schuttler |
| 2,389,377 A | | 11/1945 | Manning |
| 2,429,103 A | * | 10/1947 | Mitchell ................. F16B 39/34 411/259 |

(Continued)

FOREIGN PATENT DOCUMENTS

| | | |
|---|---|---|
| CN | 101410634 A | 4/2009 |
| CN | 204371870 U | 6/2015 |

(Continued)

OTHER PUBLICATIONS

The C50L® HuckBolt® Fastening System, Alcoa Fastening Systems, 2005 (8 pages).

(Continued)

*Primary Examiner* — Flemming Saether
(74) *Attorney, Agent, or Firm* — Greenberg Traurig, LLP

(57) ABSTRACT

A fastener including a bolt having an elongated shank having a first end, a second end opposite the first end, and a threaded portion having an external bolt thread, the bolt thread including a bolt pitch. The fastener includes a nut having a first end, a second end opposite the first end of the nut, and an internal nut thread extending between the first and second ends of the nut and adapted to engage threadedly the bolt thread of the bolt. The nut thread includes a nut pitch and a hardness that changes gradationally between the first and second ends of the nut. The bolt pitch of the bolt thread of the bolt is mismatched with the nut pitch of the nut thread of the nut.

15 Claims, 6 Drawing Sheets

(56) References Cited

U.S. PATENT DOCUMENTS

| | | |
|---|---|---|
| 2,564,029 A | 8/1951 | Peterson |
| 2,467,483 A | 9/1951 | Hotine |
| 2,615,119 A | 10/1952 | Riegel |
| 2,684,606 A | 7/1954 | Brawley |
| 3,018,684 A | 1/1962 | Brancato |
| 3,258,284 A | 6/1966 | Phipps |
| 3,394,626 A | 7/1968 | Oliver |
| 4,019,550 A * | 4/1977 | DeHaitre ............... F16B 39/34 411/303 |
| 4,171,012 A | 10/1979 | Holmes |
| 4,225,981 A | 10/1980 | Zeibig |
| 4,846,614 A | 7/1989 | Steinbock |
| 4,854,794 A * | 8/1989 | Oertel ................. F16B 39/30 411/307 |
| 4,936,727 A | 6/1990 | Kolvereid |
| 5,139,380 A | 8/1992 | Reynolds |
| 5,413,445 A | 5/1995 | Cartellione |
| 5,454,675 A * | 10/1995 | DeHaitre ............. F16B 33/004 411/303 |
| 5,738,472 A | 4/1998 | Roopnarine et al. |
| 5,779,413 A * | 7/1998 | Cosenza ................ F16B 39/34 411/302 |
| 5,865,581 A | 2/1999 | Sadri et al. |
| 5,908,276 A | 6/1999 | Kerr |
| 7,293,339 B2 | 11/2007 | Mercer et al. |
| 7,740,436 B2 | 6/2010 | Pamer |
| 7,802,953 B2 | 9/2010 | Stephen |
| 8,465,240 B2 | 6/2013 | Corbett et al. |
| 2005/0244249 A1 | 11/2005 | Sussenbach |
| 2006/0222475 A1 | 10/2006 | Breihan et al. |
| 2006/0263171 A1 | 11/2006 | Schwarz |

FOREIGN PATENT DOCUMENTS

| | | |
|---|---|---|
| DE | 9219017 U1 | 3/1992 |
| EP | 0065344 A1 | 11/1982 |
| EP | 1933044 A2 | 6/2008 |
| GB | 567862 | 3/1945 |
| GB | 855215 | 11/1960 |
| JP | 4029607 A | 1/1992 |
| JP | 8177837 A | 7/1996 |
| JP | 11315820 A | 11/1999 |
| JP | 20033074533 A | 3/2003 |
| JP | 2003183735 A | 7/2003 |
| JP | 2005511319 A | 4/2005 |
| JP | 2007511720 A | 5/2007 |
| JP | 2008142121 A | 6/2008 |
| RU | 2249628 C1 | 4/2005 |
| RU | 2249629 C1 | 4/2005 |
| WO | 2006/100766 A1 | 9/2006 |
| WO | 2007/021638 A2 | 2/2007 |
| WO | 2007/109751 A2 | 9/2007 |

OTHER PUBLICATIONS

Spiralock Company Profile—Spiralock—"More secure threads", http://www.fastening-solutions.co.uk/profiles/16/index.html, Mar. 2, 2009 (2 pages).

"Pin-rivet, grooved, Brazier Head; Straight Shank, Six Locking Grooves, Aluminum Alloy, Corrosion-resistant and Carbon Steels"; Military Specification Sheet, MIL-P-23469/2B(SH), Feb. 19, 1988 (7 pages).

ASTM International, Designation A490-10, Standard Specification for Structural Bolts, Steel, Heat Treated, 120/150 ksi Minimum Tensile Strength, May 1, 2010 (6 pages).

ASTM International, Designation A325-10, Standard Specification for Structural Bolts, Steel, Heat Treated, 120/105 ksi Minimum Tensil Strength, May 1, 2010 (8 pages).

SAE International, SAE J429, "Mechancial and Material Requirements for Externally Threaded Fasteners", 1999 (16 pages).

ASME B18.2 1-1996, "Square and Hex Bolts and Screws (Inch Series)" (86 pages).

ASME B1.1-2007, "Screw Thread Gaging Systems for Acceptability: Inch and Metric Screw Threads", Oct. 12, 2007 (21 pages).

ASME B1.1-2003, "Unified Inch Screw Threads", Sep. 30, 2004 (9 pages).

\* cited by examiner

ADVANCED NUT AND BOLT

CROSS-REFERENCE TO RELATED APPLICATIONS

This application is a divisional application relating to and claiming the benefit of commonly owned, co-pending U.S. application Ser. No. 14/553,476, filed on Nov. 25, 2014, which relates to and claims the benefit of U.S. Provisional Application Ser. No. 61/908,922 filed on Nov. 26, 2013, the disclosures of the foregoing applications are incorporated by reference herein in their entireties.

FIELD OF THE INVENTION

The present invention relates to a fastening system and, more particularly, to a vibration-resistant fastening system that includes a nut and a high fatigue strength bolt.

BACKGROUND OF THE INVENTION

A free running or prevailing torque nut that forms a vibration proof lock when tightened is desirable. The lock is formed by allowing the bolt thread to embed into the relatively softer nut thread. Reducing material weight and costs of the nut would be desirable.

SUMMARY OF THE INVENTION

In an embodiment, a fastener, comprising a bolt including an elongated shank having a first end, a second end opposite the first end, and a threaded portion having an external bolt thread, wherein the bolt thread includes a bolt pitch; and a nut including a first end, a second end opposite the first end of the nut, and an internal nut thread extending between the first and second ends of the nut and adapted to engage threadedly the bolt thread of the bolt, wherein the nut thread includes a nut pitch, wherein the bolt pitch of the bolt thread of the bolt is mismatched with the nut pitch of the nut thread of the nut. In an embodiment, the nut pitch of the nut thread of the nut is shorter than the bolt pitch of the bolt thread of the bolt. In an embodiment, when the nut thread of the nut engages the bolt thread of the bolt, an initial contact and engagement between the nut thread and the bolt thread is located at a pitch of the nut pitch that is proximate to the first end of the nut. In an embodiment, the nut pitch of the nut thread of the nut is longer than the bolt pitch of the bolt thread of the bolt. In an embodiment, when the nut thread of the nut engages the bolt thread of the bolt, an initial contact and engagement between the nut thread and the bolt thread is located at a pitch of the nut pitch that is proximate to the second end of the nut. In an embodiment, the nut includes a flange located at the first end thereof.

In an embodiment, a bolt including an elongated shank having a first end, a second end opposite the first end, and a threaded portion having an external bolt thread, wherein the bolt thread includes a bolt pitch; and a nut including a nut body having a first end, a second end opposite the first end of the nut body, and a countersunk aperture, an insert positioned within the countersunk aperture, and an internal nut thread extending between the first and second ends of the nut body and adapted to engage threadedly the bolt thread of the bolt, wherein the nut thread includes a nut pitch, wherein the bolt pitch of the bolt thread of the bolt is mismatched with the nut pitch of the nut thread of the nut.

In an embodiment, the nut pitch of the nut thread of the nut is shorter than the bolt pitch of the bolt thread of the bolt. In an embodiment, the countersunk aperture is located at the second end of the nut body. In an embodiment, the nut body is made from a first material and the insert is made from a second material that is softer than the first material. In an embodiment, when the nut thread of the nut engages the bolt thread of the bolt, an initial contact and engagement between the nut thread and the bolt thread is located at a pitch of the nut pitch that is proximate to the second end of the nut.

In an embodiment, countersunk aperture is located at the first end of the nut body. In an embodiment, the nut body is made from a first material and the insert is made from a second material that is harder than the first material. In an embodiment, the nut thread of the nut engages the bolt thread of the bolt, an initial contact and engagement between the nut thread and the bolt thread is located at a pitch of the nut pitch that is proximate to the second end of the nut.

In an embodiment, the nut pitch of the nut thread of the nut is longer than the bolt pitch of the bolt thread of the bolt. In an embodiment, the countersunk aperture is located at the second end of the nut body. In an embodiment, the nut body is made from a first material and the insert is made from a second material that is harder than the first material. In an embodiment, the nut thread of the nut engages the bolt thread of the bolt, an initial contact and engagement between the nut thread and the bolt thread is located at a pitch of the nut pitch that is proximate to the first end of the nut.

In an embodiment, the countersunk aperture is located at the first end of the nut body. In an embodiment, the nut body is made from a first material and the insert is made from a second material that is softer than the first material. In an embodiment, the nut thread of the nut engages the bolt thread of the bolt, an initial contact and engagement between the nut thread and the bolt thread is located at a pitch of the nut pitch that is proximate to the first end of the nut.

In an embodiment, a nut, comprising a first end, a second end opposite the first end, an internal nut thread extending from the first end to the second end, and a hardness, wherein the hardness gradationally changes between the first and second ends. In an embodiment, the nut includes a first hardness area extending between the first end and a first boundary located intermediate the first and second ends, a second hardness area extending from the first boundary to a second boundary located distal from the first boundary and towards the second end, and a third hardness area extending from the first boundary to the second end. In an embodiment, the hardness within the first hardness area includes a first hardness, the hardness within the second hardness area includes a second hardness, and the hardness within the third hardness area includes a third hardness. In an embodiment, the first hardness is in a range of approximately Rb 20 to approximately Rb 100, the second hardness is in a range of approximately Rb 20 to approximately Rc 60, and the third hardness is in a range of approximately Rc 20 to approximately Rc 60. In an embodiment, the hardness increases gradually from the first end to the second end. In an embodiment, a transition from the first hardness to the second hardness is abrupt, and wherein a transition from the second hardness to the third hardness is abrupt.

In another embodiment, the first hardness is in a range of approximately Rc 20 to approximately Rc 60, the second hardness is in a range of approximately Rb 20 to approximately Rc 60, and the third hardness is in a range of approximately Rb 20 to approximately Rb 100. In an embodiment, the hardness increases gradually from the second end to the first end. In an embodiment, a transition from the first hardness to the second hardness is abrupt, and wherein a transition from the second hardness to the third hardness is abrupt.

In an embodiment, at least one portion of the nut thread located proximate to the second end is locally softened, and a remaining portion of the nut thread is hardened. In an embodiment, the at least one portion of the nut thread includes a length that is approximately equal to at least a portion of a pitch thread length of the nut thread. In an embodiment, the at least one portion of the nut thread includes a length that is approximately equal to one pitch thread length of the nut thread. In an embodiment, the at least one portion of the nut thread includes a length that is approximately equal to a plurality of pitch thread lengths of the nut thread. In an embodiment, the at least one portion of the nut thread includes a length that is within a range between one pitch thread length of the nut thread and two pitch thread lengths of the nut thread.

In an embodiment, the engagement between the nut thread and the bolt thread provides a visual indication of the amount of clamp generated.

In an embodiment, a fastener, comprising a bolt including an elongated shank having a first end, a second end opposite the first end, and a threaded portion having a an external bolt thread, wherein the bolt thread includes a bolt pitch; and a nut including a first end, a second end opposite the first end of the nut, a an internal nut thread extending between the first and second ends of the nut and adapted to engage threadedly the bolt thread of the bolt, wherein the nut thread includes a nut pitch, and a hardness that changes gradationally between the first and second ends of the nut, wherein the bolt pitch of the bolt thread of the bolt is mismatched with the nut pitch of the nut thread of the nut.

In an embodiment, the nut pitch of the nut thread of the nut is shorter than the bolt pitch of the bolt thread of the bolt. In an embodiment, when the nut thread of the nut engages the bolt thread of the bolt, an initial contact and engagement between the nut thread and the bolt thread is located at a pitch of the nut pitch that is proximate to the first end of the nut. In an embodiment, the nut pitch of the nut thread of the nut is longer than the bolt pitch of the bolt thread of the bolt. In an embodiment, the nut thread of the nut engages the bolt thread of the bolt, an initial contact and engagement between the nut thread and the bolt thread is located at a pitch of the nut pitch that is proximate to the second end of the nut. In an embodiment, the nut includes a flange located at the first end thereof.

In an embodiment, the nut includes a first hardness area extending between the first end and a first boundary located intermediate the first and second ends, a second hardness area extending from the first boundary to a second boundary located distal from the from the first boundary and towards the second end, and a third hardness area extending from the first boundary to the second end. In an embodiment, the hardness within the first hardness area includes a first hardness, the hardness within the second hardness area includes a second hardness, and the hardness within the third hardness area includes a third hardness. In an embodiment, the first hardness is in a range of approximately Rb 20 to approximately Rb 100, the second hardness is in a range of approximately Rb 20 to approximately Rc 60, and the third hardness is in a range of approximately Rc 20 to approximately Rc 60. In an embodiment, the hardness increases gradually from the first end to the second end. In an embodiment, a transition from the first hardness to the second hardness is abrupt, and wherein a transition from the second hardness to the third hardness is abrupt.

In another embodiment, the first hardness is in a range of approximately Rc 20 to approximately Rc 60, the second hardness is in a range of approximately Rb 20 to approximately Rc 60, and the third hardness is in a range of approximately Rb 20 to approximately Rb 100. In an embodiment, the hardness increases gradually from the second end to the first end. In an embodiment, a transition from the first hardness to the second hardness is abrupt, and wherein a transition from the second hardness to the third hardness is abrupt.

In an embodiment, the nut wherein at least one portion of the nut thread located proximate to the second end is locally softened, and a remaining portion of the nut thread is hardened. In an embodiment, at least one portion of the nut thread includes a length that is approximately equal to at least a portion of a pitch thread length of the nut thread. In an embodiment, the at least one portion of the nut thread includes a length that is approximately equal to one pitch thread length of the nut thread. In an embodiment, the at least one portion of the nut thread includes a length that is approximately equal to a plurality of pitch thread lengths of the nut thread. In an embodiment, the at least one portion of the nut thread includes a length that is within a range between one pitch thread length of the nut thread and two pitch thread lengths of the nut thread.

DETAILED DESCRIPTION OF THE DRAWINGS

Figure 1A:
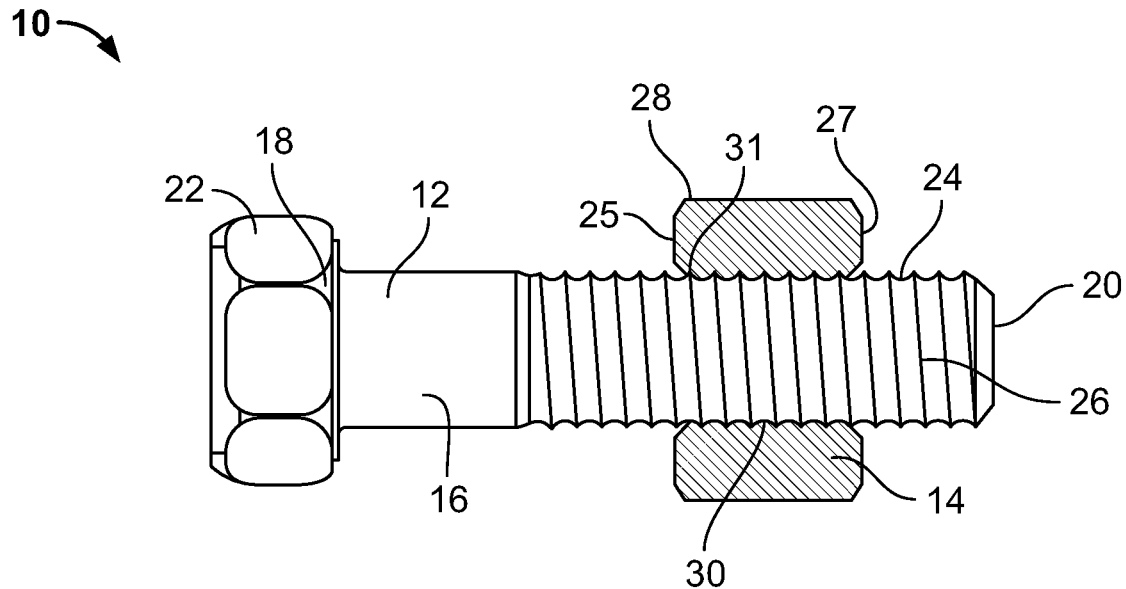
FIGS. 1A and 1B are side elevational views of embodiments of a fastener having a bolt and a nut, with a nut employed by the fastener shown in cross-section.
Figure 1B:
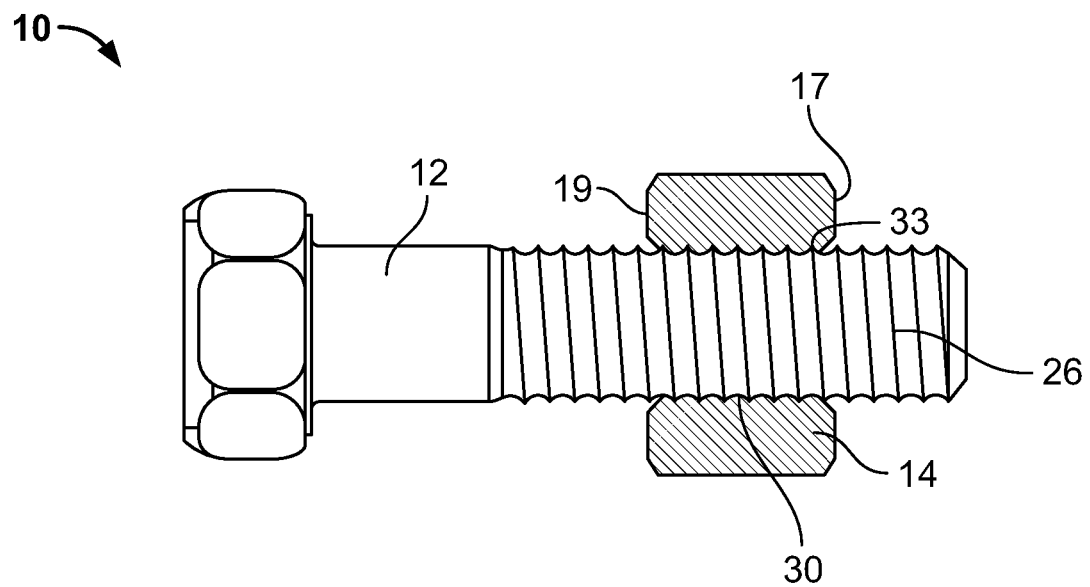

Referring to FIGS. 1A and 1B, a fastener 10 includes a bolt 12 and a nut 14 that threadedly mates with the bolt 12 for fastening two work pieces, joints, or the like to one another (not shown in the Figures). In an embodiment, the bolt 12 is a high fatigue strength bolt made from a first material, while the nut 14 is made from a second material that is softer than that the first material of the bolt 12. In another embodiment, the bolt 12 is a screw. In an embodiment, the fastener 10 has a structure similar to the fasteners disclosed in U.S. Pat. No. 8,465,240 to Corbett et al., entitled "Advanced Nut and Bolt," the disclosure of which is incorporated by reference herein in its entirety.

Still referring to FIGS. 1A and 1B, in an embodiment, the bolt 12 includes an elongated shank 16 having a first end 18 and a second end 20 opposite the first end 18, and an enlarged bolt head 22 located at the first end 18. In one or more embodiments, the bolt head 22 can consist of any type of bolt head size and shape known in the art (e.g., hex head, carriage bolt head, truss head, fillister head, etc.). In an embodiment, the shank 16 includes a threaded portion 24 having an external bolt thread 26. In an embodiment, the bolt thread 26 is a helical thread. In one or more embodiments, the bolt thread 26 of the bolt 12 is similar to those of the BOBTAIL® fasteners manufactured by Alcoa Fastening Systems, which is also disclosed in U.S. Pat. No. 7,293,339 to Mercer et al., entitled "Low Swage Load Fastening System and Method," the disclosure of which is incorporated by reference herein. An embodiment of the bolt disclosed in U.S. Pat. No. 7,293,339 includes a shallow thread, a wide bolt thread crest (relative to a nut thread crest), and a large root radius (not shown in the present Figures). In another embodiment, a shallow thread and a large root radius of the bolt thread 26 create a larger bolt cross-section and reduce stress concentration, thereby giving the bolt 12 improved fatigue and shear strength in the threaded portion 24. In an embodiment, the bolt head 22 need not be included, and the bolt 12 is an unheaded stud (not shown in the Figures).

In an embodiment, the bolt 12 is made from 4140 steel. In another embodiment, the bolt 12 is made from 50635 steel. In another embodiment, the bolt 12 is made from stainless steel. In another embodiment, the bolt 12 is made from titanium. In another embodiment, the bolt 12 is made from aluminum.

Still referring to FIGS. 1A and 1B, in an embodiment, the nut 14 includes an external hex 28 for facilitating the rotational tightening and loosening of the nut 14 on and from the bolt 12, respectively. The nut 14 includes a first end 17 and a second end 19 opposite the first end 17, and a pre-tapped, internal nut thread 30 extending from the first end 17 to the second end 19. In an embodiment, the nut thread 30 is a helical thread. In an embodiment, the nut thread 30 is adapted to engage threadedly the bolt thread 26 of the bolt 12. In an embodiment, there exists a thread pitch mismatch between the bolt thread 26 and the nut thread 30. In an embodiment, the nut thread 30 includes a nut pitch having a length that is shorter than a length of the bolt pitch of the bolt thread 26. In an embodiment, FIG. 1A shows a ⅝ inch fastener 10 having the bolt thread 26 with a bolt pitch of about 0.100 inch and the nut thread 30 with a nut pitch of about 0.099 inch. In other embodiments, the fastener 10 consists of different fastener sizes having different and corresponding bolt pitches and nut pitches wherein each of the nut pitches has a length that is shorter than a length of the corresponding bolt pitch. In an embodiment, the initial contact and engagement between the nut thread 30 and the bolt thread 26 is located at the inner most pitch 31 of the nut thread 30, i.e., that closest to the sheet line of the work piece and the second end 19 of the nut 14, and, thus, results in thread engagement at the inner most portion of the nut thread 30 closest to the sheet line.

In another embodiment, the nut thread 30 includes a nut pitch having a length that is longer than a length of the bolt pitch of the bolt thread 26. In another embodiment, the nut thread 30 includes a nut pitch having a length that is longer than a length of a bolt pitch of the bolt thread 26. In another embodiment, FIG. 1B shows a ⅝ inch fastener 10 having the bolt thread 26 with a bolt pitch of about 0.100 inch and the nut thread 30 with a nut pitch of about 0.101 inch. In other embodiments, the fastener 10 consists of different fastener sizes having different and corresponding bolt pitches and nut pitches wherein each of the nut pitches has a length that is longer than a length of the corresponding bolt pitch. In an embodiment, the initial contact and engagement between the nut thread 30 and the bolt thread 26 is located at the outer most pitch 33 of the nut thread 30, i.e., that farthest from the sheet line and the second end 19 of the nut 14, and thus results in thread engagement at the outer most portion of the nut thread 30 from the sheet line of the work piece.

In an embodiment, the nut 14 is made from 1045 steel. In another embodiment, the nut 14 is made from 1010 steel. In another embodiment, the nut 14 is made from 1215 steel. In another embodiment, the nut 14 is made from aluminum.

In an embodiment, by implementing a thread pitch mismatch between the bolt thread 26 and the nut thread 30, the fastener 10 is able to achieve lock creation (vibration resistance) at lower clamp loads and at lower torque. In an embodiment, this mismatch concentrates the initial clamp at one end of the nut thread 30 and incrementally engages more thread length as the clamp increases, as shown in FIGS. 1A and 1B. This incremental engagement allows for lock formation at much lower clamp loads and torques, and thus, a more vibration resistant fastener in an under-tightened scenario.

Figure 2A:
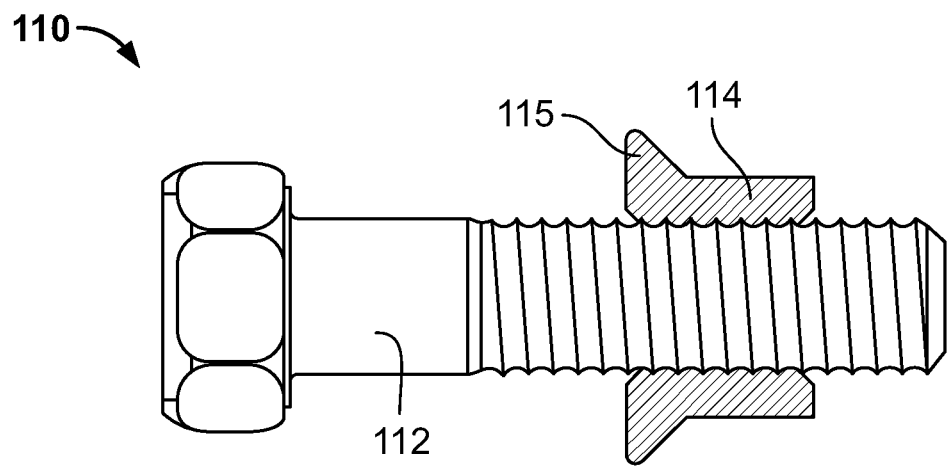
FIGS. 2A and 2B are side elevational views of other embodiments of a fastener having a bolt and a nut, with the nut employed by the fastener shown in cross-section.
Figure 2B:
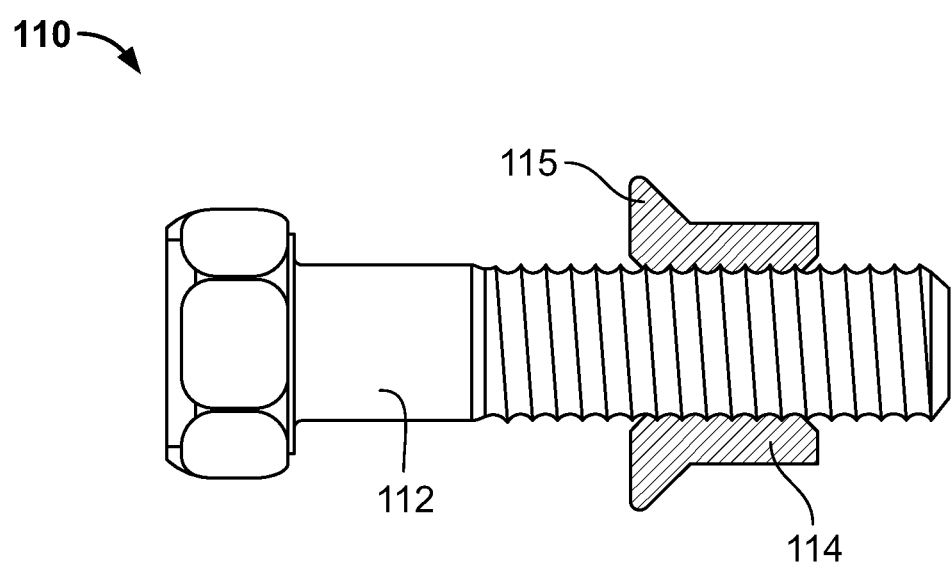

FIGS. 2A and 2B disclose embodiments of a fastener 110 having a bolt 112 and a nut 114. The embodiments of the fastener 110 shown in FIGS. 2A and 2B are constructed and function similar to the respective fasteners 10 shown in FIGS. 1A and 1B, except that the nut 114 includes a flange 115 at one end thereof. In an embodiment, the flange 115 prevents dilation of the nut 114 as the clamp load increases. In another embodiment, the nut 114 allows for less raw material usage, resulting in cost savings.

In an embodiment, the flange 115 of the nut 114 shown in FIG. 2A (i.e., with the nut pitch being shorter than the bolt pitch) will prevent dilation thereof. In another embodiment, the flange 115 of the nut 114 shown in FIG. 2B (i.e., with the nut pitch being longer than the bolt pitch and where initial contact is made on the outermost nut pitch), may not prevent dilation of the nut 114. However, an additional heat treating process on the nut 114 as described below addresses this scenario.

Figure 3A:
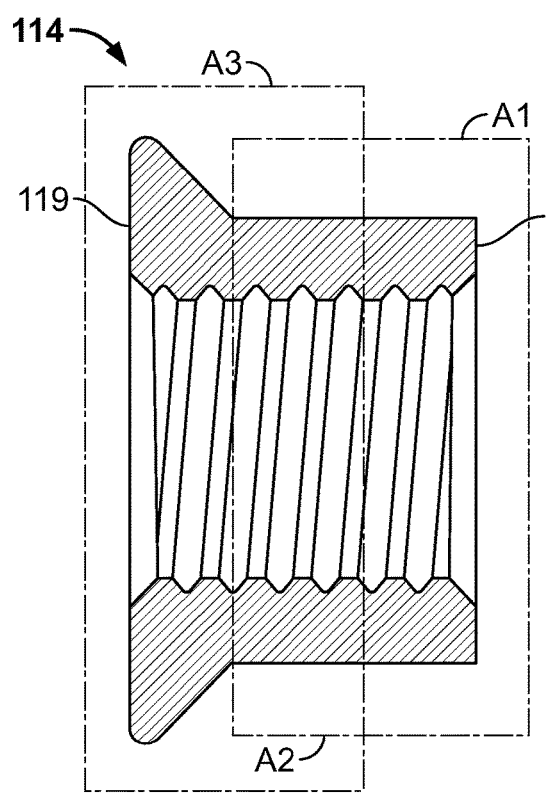
FIGS. 3A and 3B are side cross-sectional views of embodiments of a nut employed by the fasteners shown in FIGS. 2A and 2B.
Figure 3B:
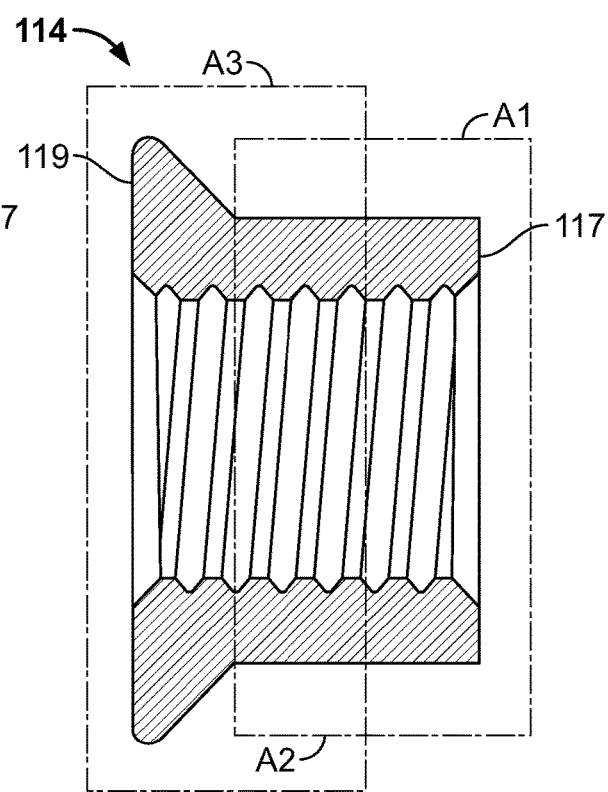

FIGS. 3A and 3B illustrate embodiments of hardness profiles of the nut 114. In an embodiment, the hardness profiles present hardness gradations from one end of the nut 114 to the other end of the nut 114. In an embodiment, the softer end of the gradation will be on the end of the initial pitch contact. In an embodiment, the hardness of the nut 114 then increases gradually until the other end of the nut 114 is reached. In an embodiment, the harder end of the nut 114 can then be oriented toward the end that has a tendency to dilate. In an embodiment, the harder material provides higher hoop strength and therefore will resist dilation. In an embodiment, the harder material also increases the tensile strength of the fastener 110, and thus, allows for further shortening of the nut 114 in order to further reduce material weight and cost. In an embodiment, the size of the nut 114 can be reduced by 10% to 20% of a standard nut.

In the embodiment shown in FIG. 3A, the hardness of the nut 114 increases from a first end 117 thereof to a second end 119 thereof. In an embodiment, area A1 has a first hardness in a range of approximately Rb 20 to approximately Rb 100; area A2 has a second hardness in a range of approximately Rb 20 to approximately Rc 60; and area A3 has a third hardness in a range of approximately Rc 20 to approximately Rc 60. Thus, in an embodiment, the harder end of the gradation will be towards the end of the initial pitch contact, i.e., located proximate to the second end 119 of the nut 114. In an embodiment, the hardness of the nut 114 increases gradually from the first end 117 thereof to the second end 119 thereof. In another embodiment, the transition from the first hardness of the area A1 to the second hardness of the area A2 is abrupt. In another embodiment, the transition from the first hardness of the area A2 to the second hardness of the area A3 is abrupt. In another embodiment, the transition from the first hardness of the area A1 to the second hardness of the area A2 is abrupt, while the transition from the second hardness of the area A2 to the third hardness of the area A3 is abrupt. As used herein, the term "abrupt" means the transition from one hardness of one area to another hardness of another adjacent area over an area that has a width of less than or equal to three pitch lengths of the nut 114. In another embodiment, the nut 114 includes only two hardness areas. In another embodiment, the nut 114 includes four hardness areas. In another embodiment, the nut 114 includes five hardness areas. In another embodiment, the nut 114 includes more than five hardness areas.

In the embodiment shown in FIG. 3B, the first hardness of the nut 114 increases from the second end 119 to the first end 117 thereof. In an embodiment, area A1 has a first hardness in a range of approximately Rc 20 to approximately Rc 60; area A2 has a second hardness in a range of approximately Rb 20 to approximately Rc 60; and area A3 has a third hardness in a range of approximately Rb 20 to approximately Rb 100. Thus, in an embodiment, the harder end of the gradation will be towards the end of the initial pitch contact, i.e., located proximate to the first end 117 of the nut 114. In an embodiment, the hardness of the nut 114 increases gradually from the second end 119 thereof to the first end 117 thereof. In another embodiment, the transition from the first hardness of the area A1 to the second hardness of the area A2 is abrupt. In another embodiment, the transition from the second hardness of the area A2 to the third hardness of the area A3 is abrupt. In another embodiment, the transition from the first hardness of the area A1 to the second hardness of the area A2 is abrupt, while the transition from the second hardness of the area A2 to the third hardness of the area A3 is abrupt. Once again, as used herein, the term "abrupt" means the transition from one hardness of one area to another hardness of another adjacent area over an area that has a width of less than or equal to three pitch lengths of the nut 114. In another embodiment, the nut 114 includes only two hardness areas. In another embodiment, the nut 114 includes four hardness areas. In another embodiment, the nut 114 includes five hardness areas. In another embodiment, the nut 114 includes more than five hardness areas.

Figure 4A:
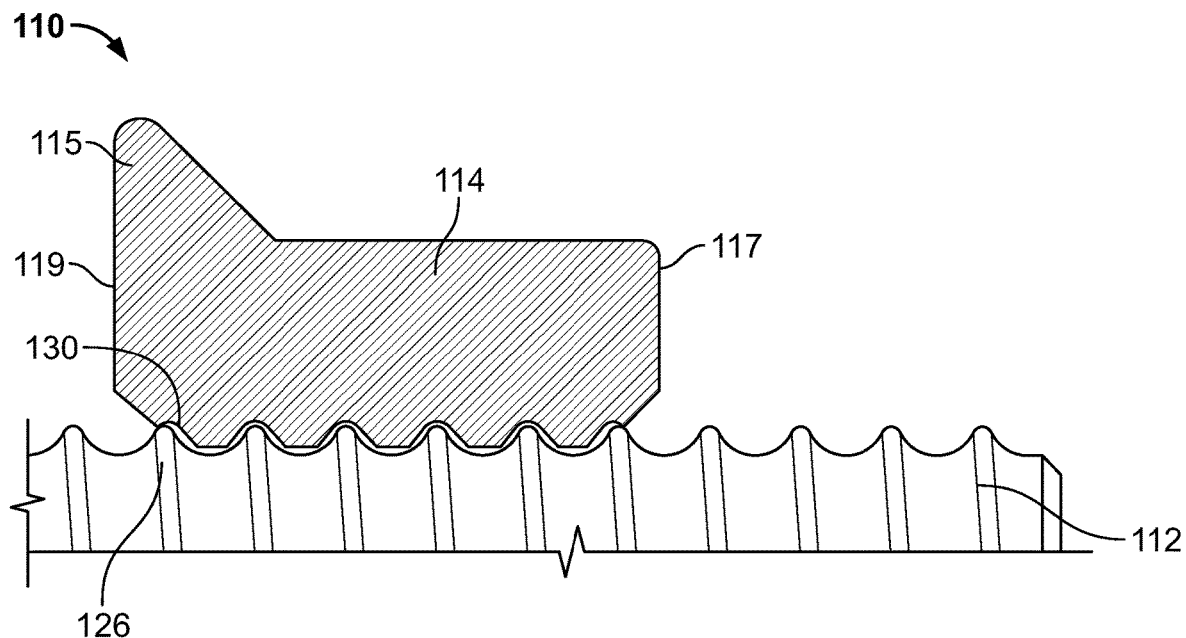
FIG. 4A is a side cross-sectional view of an embodiment of a fastener, showing pre-engagement of a nut thread of a nut with a bolt thread of a bolt.
Figure 4B:
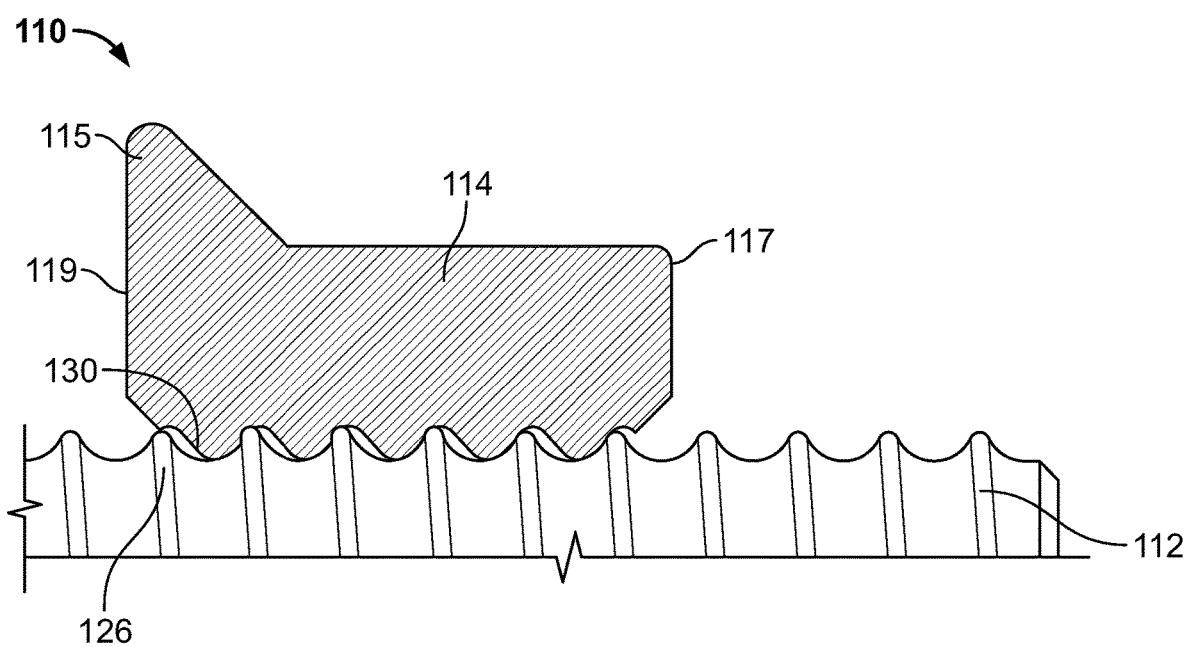
FIG. 4B is a side cross-sectional view of the fastener shown in FIG. 4A engaging the nut thread of the nut with the bolt thread of the bolt.

FIG. 4 shows an embodiment of the fastener 110 with the bolt 112 and the nut 114 engaging one another. In an embodiment, as shown in FIG. 4, at least one portion of the nut thread 130 of the nut 114 located proximate to the second end 119 thereof is locally softened for locking, while a remaining portion of the nut thread 130 is hardened for resisting dilation and achieving higher tensile. In an embodiment, the at least one portion of the nut thread 130 includes a length that is approximately equal to at least a portion of a pitch thread length of the nut thread 130. In another embodiment, the at least one portion of the nut thread 130 includes a length that is approximately equal to one pitch thread length of the nut thread 130. In another embodiment, the at least one portion of the nut thread 130 includes a length that is approximately equal to a plurality of pitch thread lengths of the nut thread 130. In another embodiment, the at least one portion of the nut thread 130 includes a length that is within a range between one pitch thread length of the nut thread 130 and two pitch thread lengths of the nut thread 130. In an embodiment, the at least one portion of the nut thread 130 is softened. In an embodiment, the at least one portion of the nut thread 130 is induction annealed. In other embodiments, the at least one portion of the nut thread 130 is locally softened by other means known in the art.

In an embodiment, the nut 114 material is 1045 steel. In another embodiment, the nut 14 is made from 1010 steel. In another embodiment, the nut 14 is made from 1215 steel. In another embodiment, the nut 14 is made from aluminum. In an embodiment, the nut thread 130 lowers the minimum clamp load in a range of about 20% to 25% of the target clamp. In another embodiment, the nut thread 130 lowers the minimum clamp load about 50% of the target clamp. In an embodiment, the nut thread 130 has a nut pitch that is shorter than the bolt pitch of the bolt thread 126, therefore allowing the nut thread 130 to embed into the bolt thread 126 before the flanks of the nut thread 130 contact the bolt thread 126.

In an embodiment, the mismatch of the nut pitch of the nut thread 130 and the bolt pitch of the bolt thread 126 allows for a rough field estimation of the clamp being generated by the installation method. This estimation can be made by observing the amount of thread engagement between the nut thread 130 and the bolt thread 126. As an example, 1⅜ inch nuts 114 were used so the degree of embedment was easier to observe. Each of these nuts 114 was installed in a Skidmore Wilhelm test fixture at four clamp loads (60,000 lbf, 80,000 lbf, 100,000 lbf, and 120,000 lbf). The length of embedment would then be a rough indicator of the clamp achieved, which is helpful in evaluating the quality of the installation without instrumentation.

Figure 5A:
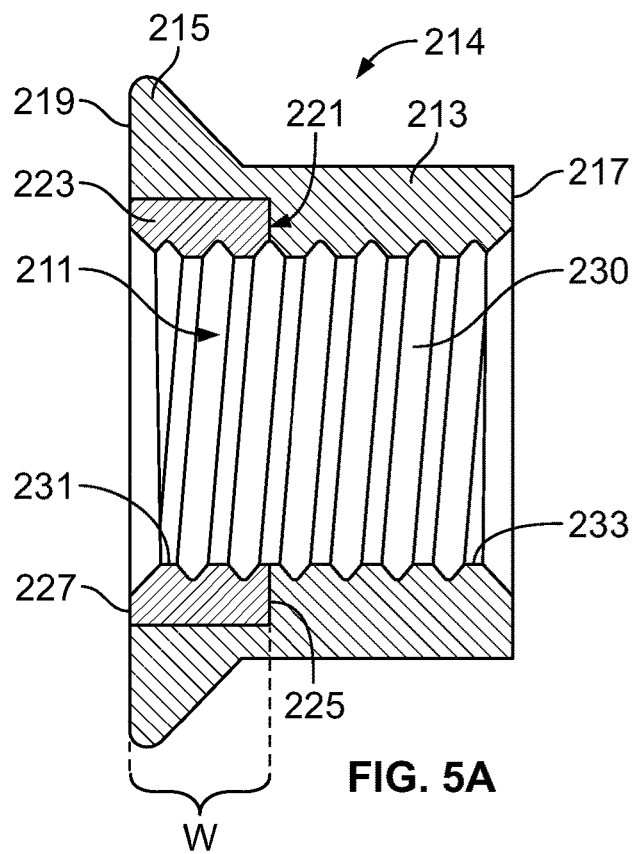
FIGS. 5A and 5B are cross-sectional views of other embodiments of a nut.
Figure 5B:
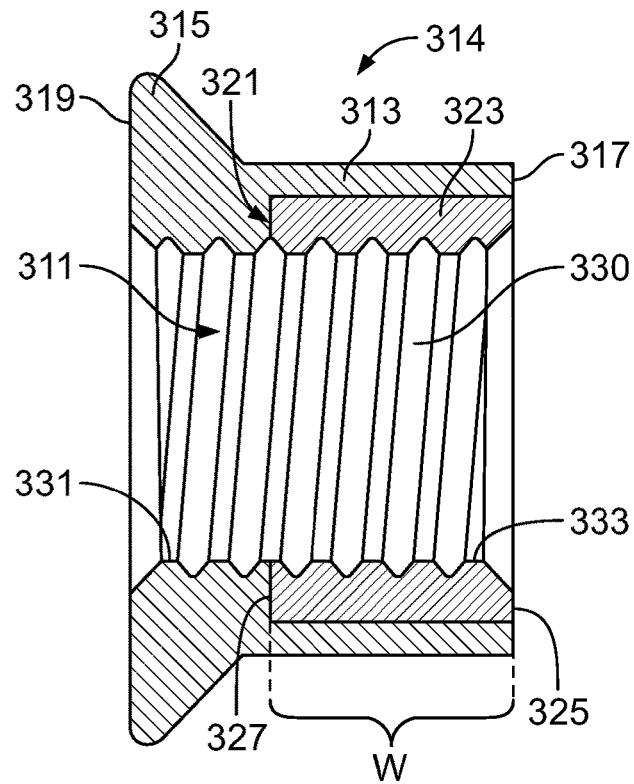

FIGS. 5A and 5B show other embodiments nuts 214, 314, respectively. The embodiments of the nuts 214, 314 shown in FIGS. 5A and 5B are constructed and function similar to the nut 114 shown in FIGS. 2A through 4B, except as otherwise noted. Referring to FIG. 5A, in an embodiment, the nut 214 includes a nut body 213 having a first end 217 and a second end 219 opposite the first end 217, a flange 215 formed at the second end 219, and an aperture 211 extending from the first end 217 to the second end 219. In an embodiment, the nut body 213 includes a centrally-located, annular countersunk aperture 221 formed within the second end 219. In an embodiment, the nut 214 includes an annular insert 223 that is sized and shaped to be inserted into and positioned within the countersunk aperture 221. In an embodiment, there is an interference fit between the insert 223 and the aperture 221. In an embodiment, the insert 223 includes a first end 225 and a second end 227 opposite the first end 225 which define a width W of the insert 223. In an embodiment, when the insert 223 is inserted within the aperture 221 of the nut body 213, the second end 227 of the insert 223 is flush with (or substantially flush with) the second end 219 of the nut body 213. In an embodiment, the nut 214 (i.e., the nut body 213 and the insert 223) is pre-tapped with an internal nut thread 230 extending from the first end 217 to the second end 219. In an embodiment, the width W of the insert 223 is so chosen such that the insert 223 extends over a length of or about three nut pitches of the nut thread 230, as shown in FIG. 5A. In another embodiment, the width W of the insert 223 is so chosen such that the insert 223 extends over a length of less than three nut pitches of the nut thread 230. In another embodiment, the width W of the insert 223 is so chosen such that the insert 223 extends over a length of more than three nut pitches of the nut thread 230.

Figure 5C:
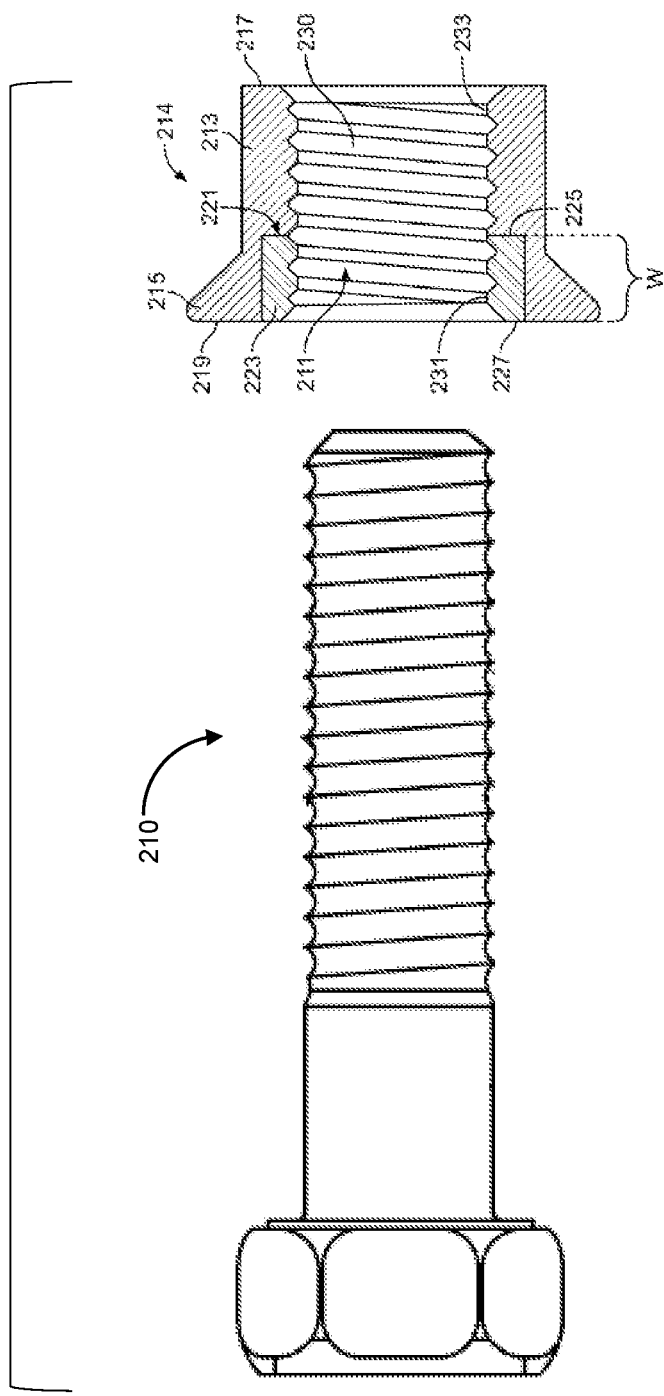
FIG. 5C is an exploded side elevational view of a bolt and the nut shown in FIG. 5A.

Referring to FIGS. 5A and 5C, in an embodiment, the nut pitch of the nut thread 230 has a length that is shorter than a length of the bolt pitch of a bolt thread of a bolt 210. In an embodiment, the nut body 213 is made from a first material and the insert 223 is made from a second material that is softer than the first material of the nut body 213. In an embodiment, the first material of the nut body 213 is made of steel and the second material of the insert 223 is made of a softer steel. In another embodiment, the first material of the nut body 213 is made of steel and the second material of the insert 223 is made of the same steel as the nut body 213 but having a lower hardness. In other embodiments, the insert 223 is made of aluminum, plastic, brass, or bronze. In an embodiment, the initial contact and engagement between the nut thread 230 and the bolt thread is located at the inner most pitch 231 of the nut thread 230, i.e., that closest to the sheet line of the work piece and the second end 219 of the nut 214, and, thus, results in thread engagement at the inner most portion of the nut thread 230 closest to the sheet line.

Still referring to FIG. 5A, in another embodiment, the nut body 213 is made from a first material and the insert 223 is made from a second material that is harder than the first material of the nut body 213. In an embodiment, the first material of the nut body 213 is made of steel and the second material of the insert 223 is made of a harder steel. In another embodiment, the first material of the nut body 213 is made of steel and the second material of the insert 223 is made of the same steel as the nut body 213 but having a higher hardness. In an embodiment, the initial contact and engagement between the nut thread 230 and the bolt thread is located at the outer most pitch 233 of the nut thread 230, i.e., that farthest from the sheet line and the second end 319 of the nut 314, and thus results in thread engagement at the outer most portion of the nut thread 330 from the sheet line of the work piece.

Referring to FIG. 5B, in an embodiment, the nut 314 includes a nut body 313 having a first end 317 and a second end 319 opposite the first end 317, an aperture 311 extending from the first end 317 to the second end 319, and a flange 315 formed at the second end 319. In an embodiment, the nut body 313 includes a centrally-located, annular countersunk aperture 321 formed within the first end 317. In an embodiment, the nut 314 includes an annular insert 323 that is sized and shaped to be inserted into and positioned within the aperture 321. In an embodiment, there is an interference fit between the insert 323 and the aperture 321. In an embodiment, the insert 323 includes a first end 325 and a second end 327 opposite the first end 325 which define a width W of the insert 323. In an embodiment, when the insert 323 is inserted within the aperture 321 of the nut body 313, the first end 325 of the insert 323 is flush with (or substantially flush with) the first end 317 of the nut body 313. In an embodiment, the nut 314 (i.e., the nut body 313 and the insert 323) is pre-tapped with an internal nut thread 330 extending from the first end 317 to the second end 319. In an embodiment, the width W of the insert 323 is so chosen such that the insert 323 extends over a length of or about five nut pitches of the nut thread 330, as shown in FIG. 5B. In another embodiment, the width W of the insert 323 is so chosen such that the insert 323 extends over a length of less than five nut pitches of the nut thread 330. In another embodiment, the width W of the insert 323 is so chosen such that the insert 323 extends over a length of more than five nut pitches of the nut thread 330.

Still referring to FIG. 5B, in an embodiment, the nut pitch of the nut thread 330 has a length that is shorter than a length of the bolt pitch of a bolt thread. In an embodiment, the nut body 313 is made from a first material and the insert 223 is made from a second material that is harder than the first material of the nut body 313. In an embodiment, the first material of the nut body 313 is made of steel and the second material of the insert 223 is made of a harder steel. In another embodiment, the first material of the nut body 313 is made of steel and the second material of the insert 323 is made of the same steel as the nut body 313 but having a higher hardness. In an embodiment, the initial contact and engagement between the nut thread 330 and the bolt thread is located at the inner most pitch 331 of the nut thread 330, i.e., that closest to the sheet line of the work piece and the second end 319 of the nut 314, and, thus, results in thread engagement at the inner most portion of the nut thread 330 closest to the sheet line.

Still referring to FIG. 5B, in another embodiment, the nut body 313 is made from a first material and the insert 323 is made from a second material that is softer than the first material of the nut body 313. In an embodiment, the first material of the nut body 313 is made of steel and the second material of the insert 323 is made of a softer steel. In another embodiment, the first material of the nut body 313 is made of steel and the second material of the insert 323 is made of the same steel as the nut body 313 but having a lower hardness. In an embodiment, the initial contact and engagement between the nut thread 330 and the bolt thread is located at the outer most pitch 333 of the nut thread 330, i.e., that farthest from the sheet line and the second end 319 of the nut 314, and thus results in thread engagement at the outer most portion of the nut thread 330 from the sheet line of the work piece.

It will be understood that the embodiments described herein are merely exemplary and that a person skilled in the art may make many variations and modifications without departing from the spirit and scope of the invention. For instance, each of the nuts 14, 114, 214, 314 described above can be substituted with a pre-tapped hole located within a structure. All such variations and modifications are intended to be included within the scope of the invention as defined in the appended claims.

What is claimed is:

1. A fastener, comprising:
    a bolt including an elongated shank having a first end, a second end opposite the first end, and a threaded portion having an external bolt thread, wherein the bolt thread includes a bolt pitch; and
    a nut including a nut body having a first end, a second end opposite the first end of the nut body, and a countersunk aperture, an insert positioned within the countersunk aperture, the insert does not extend outside the nut body first end or the nut body second end, and an internal nut thread extending between the first and second ends of the nut body and adapted to engage threadedly the bolt thread of the bolt, wherein the nut thread includes a nut pitch, the nut pitch being the same in the nut body and the insert between the first and second ends of the nut body,
    wherein the bolt pitch of the bolt thread of the bolt is mismatched with the nut pitch of the nut thread of the nut.

2. The fastener of claim 1, wherein the nut pitch of the nut thread of the nut is shorter than the bolt pitch of the bolt thread of the bolt.

3. The fastener of claim 2, wherein the countersunk aperture is located at the second end of the nut body.

4. The fastener of claim 2, wherein when the nut thread of the nut engages the bolt thread of the bolt, an initial contact and engagement between the nut thread and the bolt thread is located at a pitch of the nut pitch that is proximate to the second end of the nut.

5. The fastener of claim 1, wherein the nut body is made from a first material and the insert is made from a second material that is softer than the first material.

6. The fastener of claim 1, wherein the countersunk aperture is located at the second end of the nut body.

7. The fastener of claim 6, wherein the nut body is made from a first material and the insert is made from a second material that is harder than the first material.

8. The fastener of claim 7, wherein when the nut thread of the nut engages the bolt thread of the bolt, an initial contact and engagement between the nut thread and the bolt thread is located at a pitch of the nut pitch that is proximate to the second end of the nut.

9. The fastener of claim 1, wherein the nut pitch of the nut thread of the nut is longer than the bolt pitch of the bolt thread of the bolt.

10. The fastener of claim 9, wherein the countersunk aperture is located at the second end of the nut body.

11. The fastener of claim 10, wherein the nut body is made from a first material and the insert is made from a second material that is harder than the first material.

12. The fastener of claim 11, wherein when the nut thread of the nut engages the bolt thread of the bolt, an initial contact and engagement between the nut thread and the bolt thread is located at a pitch of the nut pitch that is proximate to the first end of the nut.

13. The fastener of claim 9, wherein the countersunk aperture is located at the first end of the nut body.

14. The fastener of claim 13, wherein the nut body is made from a first material and the insert is made from a second material that is softer than the first material.

15. The fastener of claim 14, wherein when the nut thread of the nut engages the bolt thread of the bolt, an initial contact and engagement between the nut thread and the bolt thread is located at a pitch of the nut pitch that is proximate to the first end of the nut.

* * * * *